O. R. THOMAS.
TRUCK.
APPLICATION FILED MAR. 8, 1917.
1,230,341.
Patented June 19, 1917.
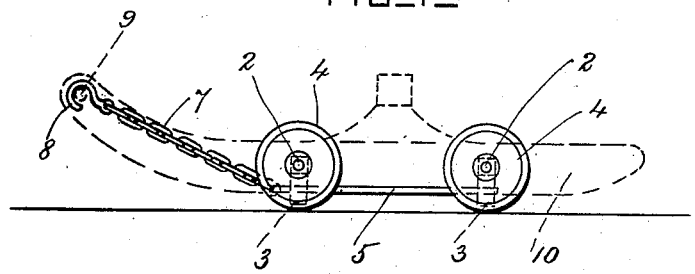
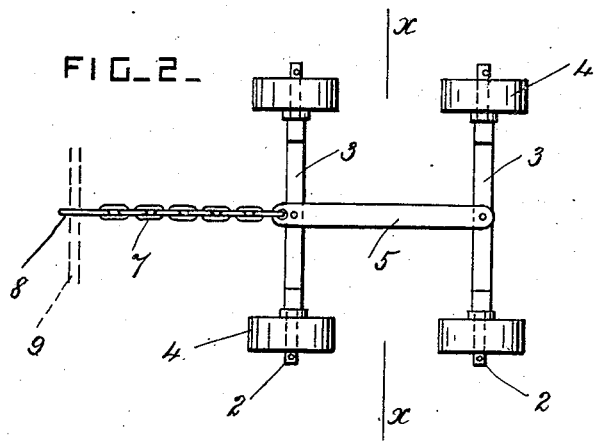
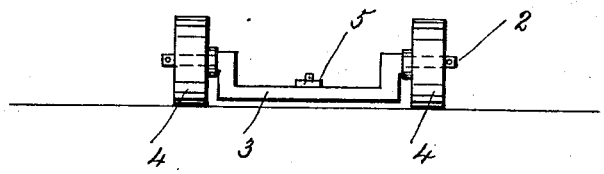
Inventor
Obed R. Thomas
by Herbert W. Jenner
Attorney.

UNITED STATES PATENT OFFICE.

OBED R. THOMAS, OF ROSSIE, IOWA.

TRUCK.

1,230,341.
Specification of Letters Patent.
Patented June 19, 1917.

Application filed March 8, 1917. Serial No. 153,361.

*To all whom it may concern:*

Be it known that I, OBED R. THOMAS, a citizen of the United States, residing at Rossie, in the county of Clay and State of Iowa, have invented certain new and useful Improvements in Trucks; and I do hereby declare the following to be a full, clear, and exact description of the invention, such as will enable others skilled in the art to which it appertains to make and use the same.

This invention relates to trucks for moving sleighs when it is not convenient or practicable for their runners to be slid over the ground; and it consists in the novel construction and combination of the parts hereinafter fully described and claimed.

In the drawings, Figure 1 is a side view of a truck constructed according to this invention, showing the sleigh in dotted lines. Fig. 2 is a plan view of the truck. Fig. 3 is a cross-section through the truck taken on the line $x$—$x$ in Fig. 2.

Two axles 2 are provided, and each axle has a rectangular downwardly cranked middle portion 3. The truck wheels 4 are journaled on the end portions of the axles, and 5 is a reach which is pivoted or otherwise secured between the middle portions 3 of the axles so as to hold them at the desired distance apart.

A chain 7 is secured to the middle portion of the front axle, and 8 is a hook or other fastening device on the chain for engaging with a cross-bar 9 or other convenient part at the front end portion of the sleigh. The runners 10 of the sleigh are placed in the cranked middle portions of the axles, as shown in Fig. 1, and the chain or flexible connection 7 prevents the sleigh from being pulled forwardly off the truck. When two sleighs are provided and are connected by a reach and arranged one in front of the other, each sleigh may be provided with a similar truck as hereinbefore described.

What I claim is:

1. A truck comprising two axles each having a downwardly cranked middle portion, wheels journaled on the end portions of the axles, a reach extending between the middle parts of the axles, and a flexible draft connection attached to the front axle.

2. A truck comprising two axles each having a rectangular downwardly cranked middle portion adapted to receive the runners of a sleigh, wheels journaled on the end portions of the axles, a reach extending between the middle parts of the axles, and a flexible draft connection attached to the front axle and provided with a fastening device for coupling it to the front end portion of the sleigh.

In testimony whereof I have affixed my signature.

OBED R. THOMAS.

Copies of this patent may be obtained for five cents each, by addressing the "Commissioner of Patents, Washington, D. C."